United States Patent
Kaufman et al.

(10) Patent No.: US 8,623,440 B2
(45) Date of Patent: Jan. 7, 2014

(54) HIGH PRESSURE FOOD PACKAGE AND SYSTEM

(75) Inventors: Galen D. Kaufman, Boerne, TX (US); Andrew Kegler, Ripon, WI (US); Qingyue Ling, Tigard, OR (US)

(73) Assignee: The Fizzy Fruit Company, Portland, OR (US)

( * ) Notice: Subject to any disclaimer, the term of this patent is extended or adjusted under 35 U.S.C. 154(b) by 589 days.

(21) Appl. No.: 11/943,964

(22) Filed: Nov. 21, 2007

(65) Prior Publication Data

US 2008/0175966 A1    Jul. 24, 2008

Related U.S. Application Data

(60) Provisional application No. 60/886,086, filed on Jan. 22, 2007.

(51) Int. Cl.
*B65B 25/06* (2006.01)

(52) U.S. Cl.
USPC ..................... 426/397; 220/203.01

(58) Field of Classification Search
USPC ........... 141/64, 68, 301; 426/312; 220/203.01
See application file for complete search history.

(56) References Cited

U.S. PATENT DOCUMENTS

| | | | | |
|---|---|---|---|---|
| 1,232,271 | A * | 7/1917 | Franks | 426/397 |
| 5,069,020 | A * | 12/1991 | Sanfilippo et al. | 53/510 |
| 5,263,777 | A * | 11/1993 | Domke | 383/103 |
| 5,277,922 | A * | 1/1994 | Rejimbal et al. | 426/333 |
| 5,566,730 | A * | 10/1996 | Liebmann, Jr. | 141/64 |
| 5,584,409 | A * | 12/1996 | Chemberlen | 220/89.1 |
| 5,586,588 | A | 12/1996 | Knox | |
| 6,491,175 | B1 | 12/2002 | Taha | |
| 7,165,581 | B2 | 1/2007 | Chantalat | |
| 7,178,555 | B2 | 2/2007 | Engel et al. | |
| 2004/0101606 | A1* | 5/2004 | Ling et al. | 426/419 |
| 2006/0016511 | A1* | 1/2006 | Chantalat | 141/64 |

* cited by examiner

*Primary Examiner* — Rena Dye
*Assistant Examiner* — Chaim Smith
(74) *Attorney, Agent, or Firm* — J. Douglas Wells (57) ABSTRACT

A high pressure food package and system including a cup for holding a quantity of food product, a lid for covering the cup, and at least one one-way sealing mechanism that permits a gas to pass through the sealing mechanism into the interior space enclosed by the cup and lid and that prevents the gas from escaping from the interior space through the sealing mechanism. The high pressure package (and system and method for using the same) is especially well suited for producing a food product (such as fruits or vegetables) having an effervescent sensory (or carbonated) character.

1 Claim, 8 Drawing Sheets

HIGH PRESSURE FOOD PACKAGE AND SYSTEM

CROSS-REFERENCE TO RELATED APPLICATIONS

This application claims the benefit of U.S. provisional application Ser. No. 60/886,086 filed on Jan. 22, 2007, which is incorporated herein by reference in its entirety.

BACKGROUND OF THE INVENTION

The disclosure herein generally relates to designs for a high pressure food package and system and, more particularly, to designs for a modified atmosphere food package that is capable of retaining a high internal pressure and designs for a system for using such package(s). Various embodiments are described, some of which incorporate features for the automatic release of excessive internal pressure that might be caused by heating, pressure differentials, internal fermentation of the product contained, or other factors.

Modified atmosphere packaging generally refers to the practice of modifying the composition of the internal atmosphere or headspace of a package in order to improve the shelf-life of the product. The product is typically a food product but may also include pharmaceuticals or other types of products. The modification usually involves attempts to lower the amount of oxygen in order to slow down the growth of aerobic organisms and the speed of oxidation reactions. The removed oxygen is typically replaced with nitrogen, commonly known as an inert gas, or carbon dioxide, which can lower the pH or inhibit the growth of bacteria.

In the context of food products, modified atmosphere packaging is generally considered a technique used for prolonging the shelf-life of fresh or minimally processed foods. In this preservation technique, the air surrounding the food in the package is changed to another composition using, for example, a gas-flush process. The initial fresh state of the food may be prolonged by slowing the natural deterioration of the food product. Respiring foods such as fruits and vegetables continue to take in oxygen and give off carbon dioxide as they continue to respire and ripen after harvest. Refrigeration and controlled atmosphere storage methods may be used to retard the ripening process. Reducing temperature slows the produce metabolism, including the rate of respiration. Under controlled atmosphere storage, respiration and ripening may be reduced further by lowering the oxygen content of the air, which normally consists of approximately 21% oxygen, 78% nitrogen, and 1% other elements.

A recent need for using modified atmospheres, specifically carbon dioxide ($CO_2$), is to enhance the flavor of foods by creating an effervescent character during tasting (e.g. U.S. Pat. No. 5,968,573, which is incorporated herein by reference). This method involves the generation of positive $CO_2$ pressure within a sealable container filled with food such that the $CO_2$ diffuses by osmosis into the water content of the food. The development of carbonated foods (e.g. FIZZY FRUIT™ branded carbonated fruit products) has created a need for a safe and convenient package to distribute single servings.

One example of a package directed to retaining a positive pressure atmosphere within the package is a tennis ball can (or tennis ball tube). The air pressure inside a tennis ball is typically 12 psi (pounds per square inch) greater than the ambient air pressure at sea level. Over time, air escapes from the inside of the ball causing a decrease in the amount of air pushing on the inside of the ball and, consequently, decreasing the bounce characteristics of the ball. To prevent the ball from becoming "flat," the ball is packaged in a positive pressure tube, with the tube pressurized to around 12 psi, which is enough to prevent air from escaping from the inside of the ball. Another example of a positive pressure package is the ubiquitous soda bottle, which is directed to maintaining carbon dioxide saturated liquid under pressures of up to 50 psi.

Designs for a high pressure food package and system that provides a sufficiently pressurized and controllable gaseous environment are desirable. Such designs may be applicable for use with the carbonated fruits or vegetables products described in U.S. Pat. No. 5,968,573, U.S. patent application Ser. No. 10/857,043, or U.S. application Ser. No. 11/454,814, all commonly owned or licensed by The Fizzy Fruit Company and each of which is incorporated herein by reference.

BRIEF DESCRIPTION OF THE SEVERAL VIEWS OF THE DRAWINGS

For a more complete understanding of the present invention, the drawings herein illustrate examples of the invention. The drawings, however, do not limit the scope of the invention. Similar references in the drawings indicate similar elements.

DETAILED DESCRIPTION OF PREFERRED EMBODIMENTS

In the following detailed description, numerous specific details are set forth in order to provide a thorough understanding of the preferred embodiments. However, those skilled in the art will understand that the present invention may be practiced without these specific details, that the present invention is not limited to the depicted embodiments, and that the present invention may be practiced in a variety of alternate embodiments. In other instances, well known methods, procedures, components, and systems have not been described in detail.

Various operations may be described as multiple discrete steps performed in turn in a manner that is helpful for understanding the preferred embodiments. However, the order of description should not be construed as to imply that these operations are necessarily performed in the order they are presented, nor even order dependent. Lastly, repeated usage of the phrase "in one embodiment" does not necessarily refer to the same embodiment, although it may.

As an overview, the present inventors determined that designs for a high pressure food package and system are needed that provide a package with a sufficiently pressurized and controllable gaseous modified atmosphere for a quantity of product, such as, for example, fresh-cut fruits or vegetables, yet at the same time remains safe, easy to open and use, re-sealable, and portable. However, the present inventors discovered that some types of packaging are less desirable because: the package may have too small of an opening to allow for easy access to food pieces (i.e. the package was designed (by others) for other types of (liquid) products); the package is not capable of maintaining the positive pressure levels necessary to effectively enhance the flavor of foods (i.e. effervescence); and/or the package comprises materials and methods that do not readily fit into the recycling stream. For example, one package under development for carbonating foods uses an aluminum lid seamed to a plastic cup. This makes recycling more difficult because of the tight weld between the two materials, which cannot be separated easily enough using existing reclaiming methods. This aluminum/plastic type of package may also create potentially dangerous metal edges if the package were to burst open from too much internal pressure, for example from internal fermentation of the food product. Consequently, the present inventors determined that not only is it desirable that the new package hold sufficient internal pressure, but it is desirable that the new package be capable of automatically releasing excessive internal pressure.

The present inventors discovered that for some types of packaging, once a container with a fixed amount of food is initially pressurized to its maximum level with gas and then sealed, the gas in the head space will gradually diffuse into the tissues of the food product and reduce the overall internal pressure within the package. The reduced internal pressure level may not be sufficient to produce the intended strongly enhanced or effervescent flavor profile for the particular food product. In testing one embodiment of the aluminum/plastic type package described above, after the initial gas pressurization to the package's maximum capability (i.e. approximately 35 psi), the pressure equilibrates after diffusion into the tissues of the food product so as to reduce the internal pressure of the package to only about 20 psi, resulting in weaker effervescence than desired.

The present inventors further discovered that with various other methods for enhancing food flavor with carbon dioxide, the level of carbonation (or absorbed carbon dioxide) varies with the internal pressure of carbon dioxide during the step of maintaining the internal pressure within the package or container. The inventors discovered that this relationship can be controlled by pressure devices that are capable of setting a specific internal pressure level of carbon dioxide, and that this resulted in an effervescent (or "fizzy") tasting intensity that can be reproduced more reliably. A "fizziness" scale from 1 to 5 is currently being developed by the inventors to qualitatively describe this relationship to internal $CO_2$ pressure. However, the inventors determined that existing packaging systems are not capable of controlling and maintaining the internal pressure level at specific levels, especially high levels.

The present inventors invented a high pressure food package and system that provides, in one embodiment: a high pressure food package comprising a sealable container having a wide mouth cup and lid, the sealable container suitably designed for holding a quantity of non-liquid food product, and an integral or separate gas seal within the sealable container capable of retaining and maintaining a positive pressure within the sealable container, the gas seal configured so that the positive pressure inside the container energizes (i.e. makes stronger) the seal; and a collar and apparatus capable of holding the container and filling the container through its seal during partial closure of the lid onto the cup with a desired quantity of gas to create a specific sensory level of effervescence.

In one embodiment, the package is capable of providing a pressurized carbon dioxide rich atmosphere, initially to approximately 60 psi, and equilibrating to approximately 40 psi, for carbonating or maintaining the carbonation of a quantity of food, such as fruits or vegetables. In one embodiment, an optimum amount of oxygen is provided in the gas mixture to avoid dangerous anaerobic conditions if the food product is not itself inherently toxic (e.g. acidic) to such pathogens. The gas mixture may comprise a predetermined combination of $CO_2$ and $O_2$. For example, the gas mixture may comprise 95% $CO_2$ and 5% $O_2$ in order to provide an effervescent character to the food product yet prevent anaerobic microbial growth (e.g. *C. botulinum*).

In one embodiment, a collar apparatus holds the cup down with a vacuum while filling through the threaded seal and partially closed lid the desired volume and composition of gasses internally. The desired volume is detected by a pressure sensor which stops the filling and releases the vacuum after the lid is tightened to a specific torque level. In one embodiment, an apparatus fills the package mechanically with the desired modified atmosphere to a controllable level of pressure.

In one embodiment, the high pressure food package comprises a sealable container having a wide mouth cup and lid, the lid having on its surface a one-way valve through which gas may be injected into the container, and a foil liner or other membrane suitably designed so as to burst when internal pressure within the container exceeds a predetermined level. For example, the high pressure food package may comprise a plastic cup and screw-on type threaded lid within which a quantity of product, such as a portion or a serving of fresh-cut fruits or vegetables, may be retained in a modified atmosphere (comprising, in part, pressurized carbon dioxide), the lid having a one-way membrane type valve as well as a foil liner. In one embodiment, the foil liner is sealed to the rim of the cup whereafter gas may be injected into the container through the one-way valve. In one embodiment, a hand operated gas filling device may be used for injecting the gas into the sealed container (through the one-way valve).

Figure 1A:
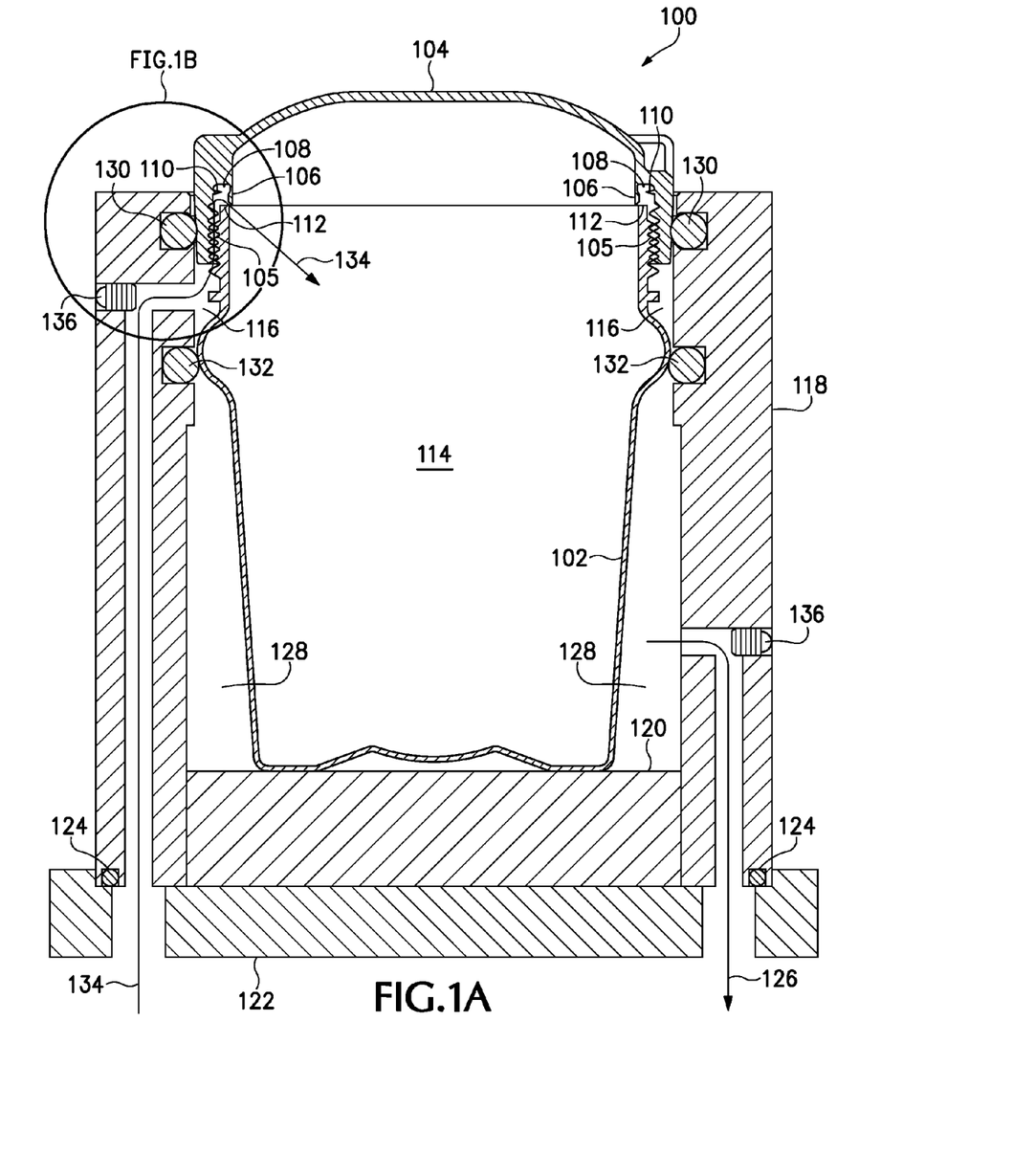
FIG. 1A is a sectional side view of an exemplary high pressure food package and system.

Now referring to FIG. 1, a sectional side view of an exemplary high pressure food package and system, it can be seen that one embodiment of the package system 100 includes a polyethylene terephthalate (PET or PETE) plastic wide mouth cup 102 and polypropylene (PP) lid 104 joined with four (12 pitch, 0.083") interrupted threads 105 and a built in one or more point seal 106, 108, 110 inside the lid which comes into contact with the top rim 112 of the cup during tightening. Preferably, the rim 112 defines an opening into the cup 102 that is wide enough to allow finger access to chunks or pieces of non-liquid food product previously introduced into the cup 102. Other materials may be used for the cup 102 and lid 104, and the one or more point seal 106, 108, 110 may be formed integral to the cup 102 or lid 104 or may comprise separate components suitably fit to the cup 102 or lid 104 so as to provide a sealing function. As shown, seal 106 comprises a flap of material, annular in shape, formed integral to the lid 104, and allows for gas to flow into the cup interior space 114 but prevents gas from flowing back out of the interior space 114 when the pressure in the space 114 exceeds an opposing pressure external to the cup 102 and lid 104 (and acting through the threads 104). The lid 104 may include a one or more point seal 108, 110 that engage with surfaces proximate to the rim 112 when the lid 104 is tightened downward upon the cup 102. The threads 105 may or may not be interrupted type threads and may comprise other configurations in terms of pitch, size, and count.

A pressure chamber 116 is formed by collar housing 118, support block 120, bottom O-ring 124 and base plate 122, which together hold the (as shown, partially closed) cup 102 and lid 104 assembly down by means of a vacuum 126 created in the pressure chamber 128 against the barrier of the cup and lid touching the upper 130 and lower O-rings 132.

Figure 1B:
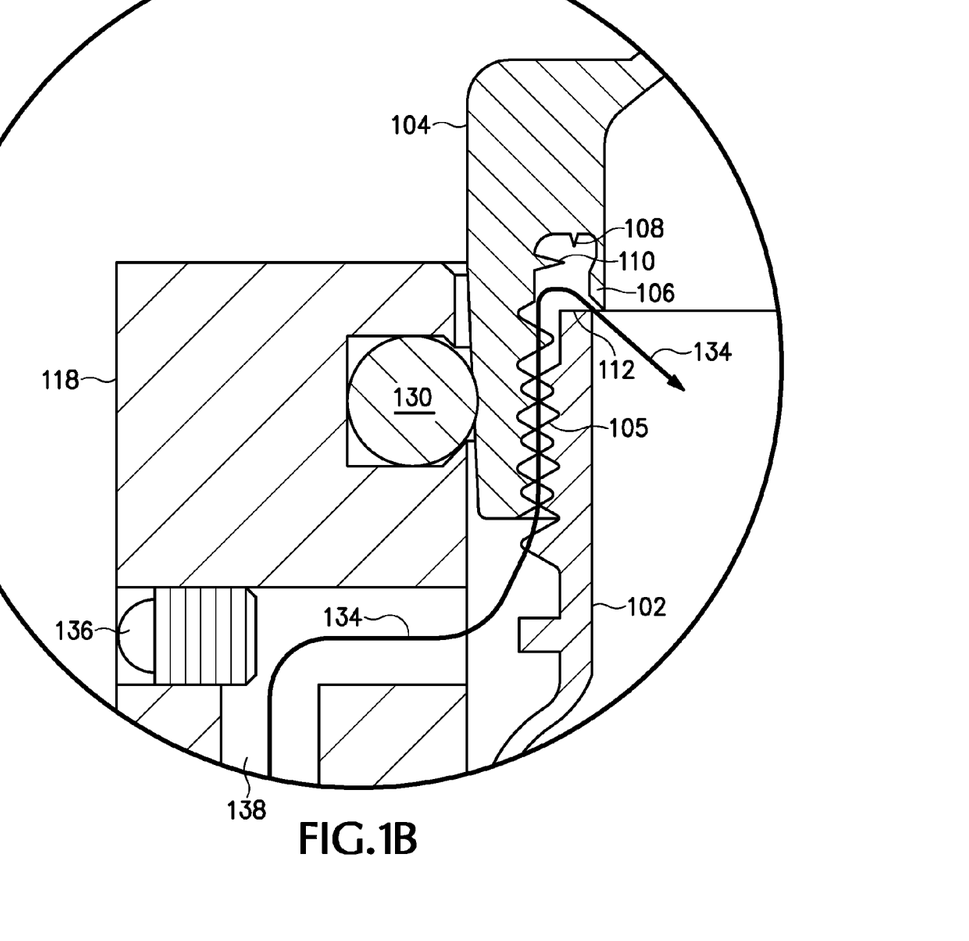
FIG. 1B is a detail sectional side view of a seal and thread region of the high pressure food package and system of FIG. 1A.

When the vacuum 126 is applied, the cup and lid assembly is held down while the desired gas 134 (e.g. CO2) is pumped into the package through the threads 105 apposing and joining the cup 102 and lid 104. The detail view in FIG. 1B shows the path of the gas by the arrow 134. As shown, a plug 136 may be used to block off additional access to the flow path 138 for the gas 134. A flap of lid material 106 acts as a one-way valve allowing pressure to build within the interior space 114 of the package. When a desired internal pressure is detected, the pressurization stops and is removed, and the same flap 106—due to its elasticity—acts to seal the pressure inside the package by way of its apposition against the cup rim 112. The internal pressure itself acts to energize this seal 106.

In various embodiments the package may comprise a screw lid which can hold pressure by means of an integral or separate pressure energized seal. The seal, such as the material flap 106 shown, is forced against the edge of the cup 102 and lid 104 (proximate to the rim 112) in such a way as to provide a very low torque required to open the cup and lid package. Other screw cap designs require a compression force between the lid/seal and cup/seal, but in the arrangement shown in FIGS. 1A-1B the material flap seal 106 provides a greater sealing force as the pressure is increased within the cup. The gas filling method may use a partially engaged seal and still allow pressure to build inside the cup because the differential pressure between the collar chamber and the package would flex the material flap seal 106 inward, creating a gas flow path 134. An adhesive strip may be applied over the junction of the cup 102 and lid 104 to prevent inadvertent lid rotation and to provide indication of product tampering.

Several different embodiments of a pressure energized seal, using one or multiple points of contact between the lid 104 and the cup 102, may be used. The seal may be integral (part of the lid 104) or separate (such as an O-ring) or applied as a different material coated onto the lid 104. For example, the seal may be a soft but durable substance such as silicon sprayed onto the surface of the lid. Additional material might be added to the screw threads 105 (on either or both of the cooperatively sized threads on the lid 104 and cup 102) to assist in sealing.

Another embodiment may include curved fitted forms at the edge of the lid 104 and cup 102, such that internal pressure inside the package holds the lid and cup together by means of the apposition of the forms, which fit together like two spoons.

In one embodiment, the lid 104 after package pressurization (i.e. after filling the package with gas) is tightened (to a specific torque) against the cup 102 by means of a torque wrench fitted to grab the lid using small fins protruding from the lid exterior surface for traction/grip. Preferably, opening the pressurized container (or depressurization) is accomplished by turning the lid to allow pressurized gas within the package to vent through the screw threads 105. Re-tightening or re-sealing the lid 104 after opening the package may provide extended retention of the modified atmosphere in product remaining in the package. Preferrably, the re-sealed package is capable of retaining a positive internal pressure (as gas escapes from the food product and into the internal space 114 within the package or if additional gas is injected into the re-sealed package) so as to extend, maintain, or improve the effervescent character of the remaining product.

In one embodiment, PETE plastic may be used for one or both of the cup 102 and lid 104 and may be "oriented" such that overpressure first stretches and then rips longitudinally to prevent shrapnel. Preferably, materials used for the cup 102 and lid 104 comprise food-grade materials suitable for holding food product and are recyclable using currently available reclaiming/recycling methods. Preferably, the materials and designs used for the cup and lid package are such that the package is able to safely maintain internal pressures (measured as the differential pressure above ambient or external pressure, at sea level) of up to 90 psi so as to handle varied market conditions, for example, hot days, air travel, and dropping the package.

In one embodiment, different colors of material may be used for one or both of the cup 102 and lid 104 to indicate the specific content of the package. For example, different colors may be used for particular types or combinations of fresh cut or minimally processed fruits or vegetables that may comprise the packaged product. As another example, a particular color may be used for packaged carbonated fresh fruit, and a different color may be used where the non-liquid food product comprises high viscosity sauces or smoothies.

Figure 2:
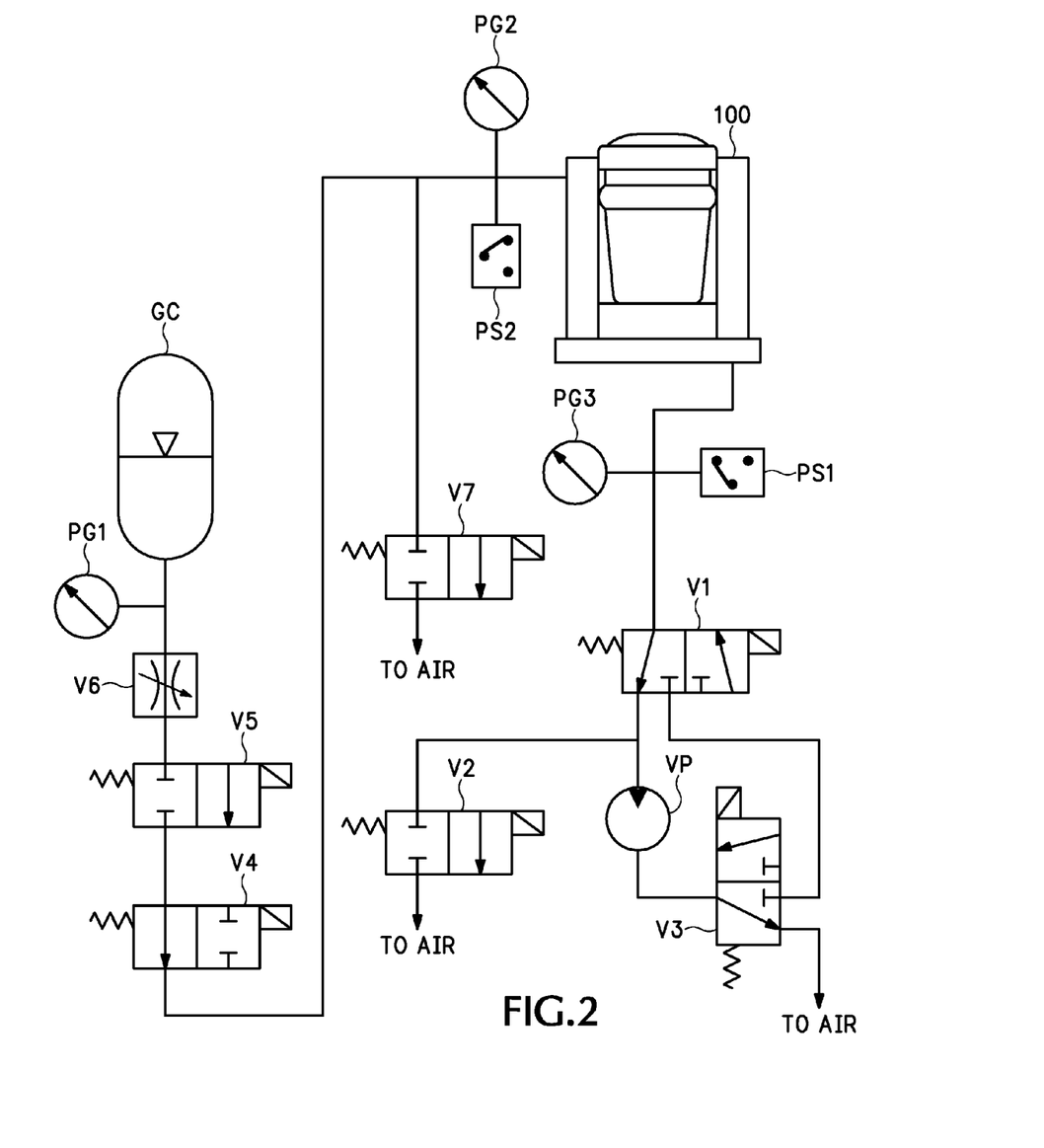
FIG. 2 is an exemplary schematic for a pneumatic system for use with the high pressure food package and system of FIG. 1A.
Figure 3A:
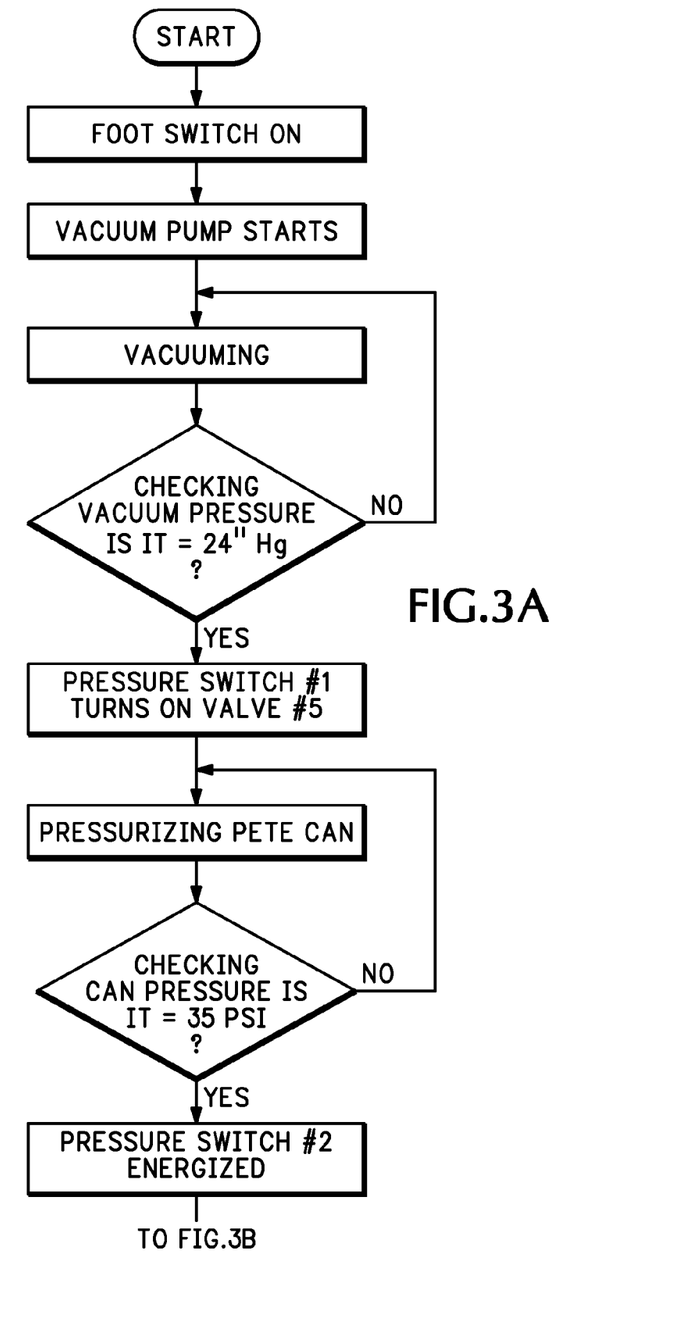
FIGS. 3A-3B are an exemplary flow chart showing method steps for operating the system of FIG. 2.
Figure 3B:
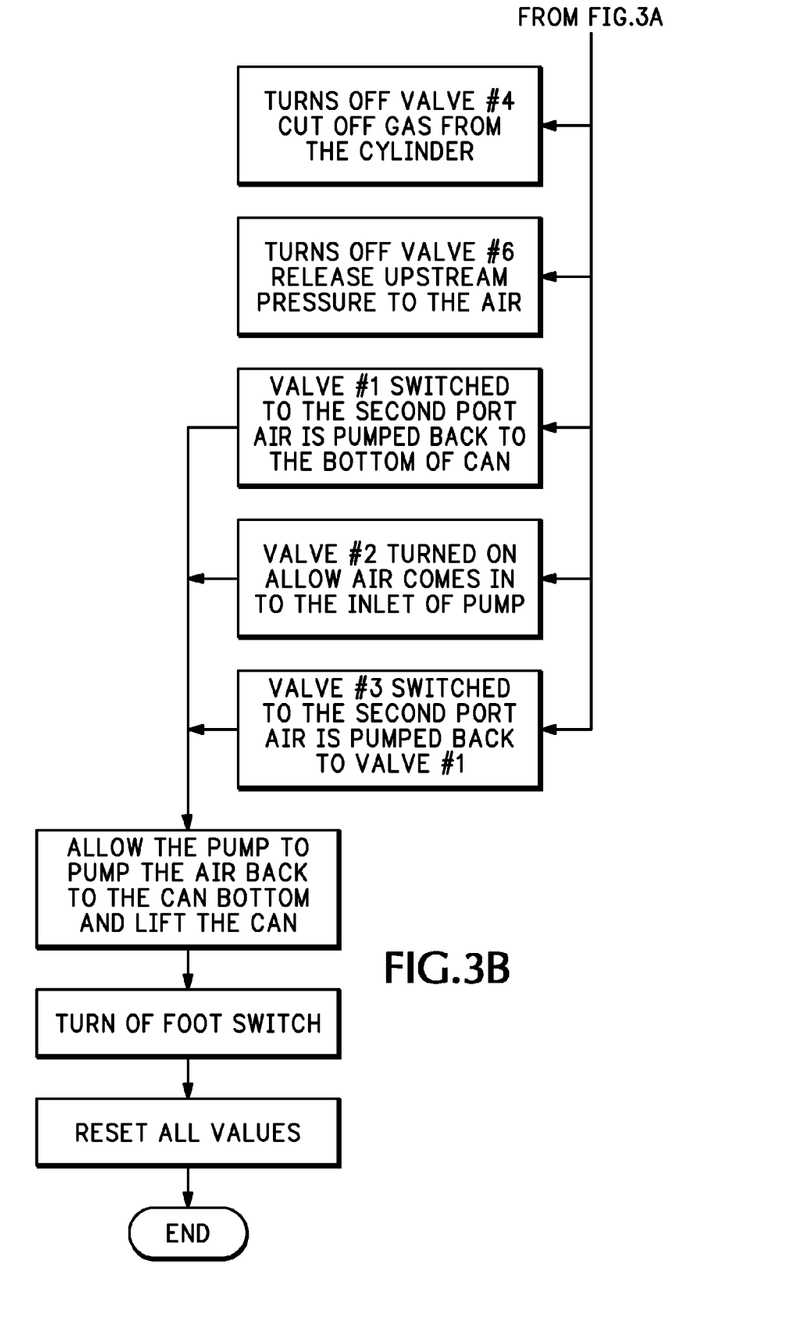

Now referring to FIG. 2, an exemplary schematic for a pneumatic system for use with the high pressure food package and system of FIG. 1A is provided. FIGS. 3A-3B provide an exemplary flow chart showing method steps for operating the system of FIG. 2.

In one embodiment, the package system 100 may be controlled by a series of valves and switches so that the simple action of dropping a partially closed cup and lid assembly into the housing 118 while pressing a foot switch results in a sequence of events that holds the package down by vacuum, pressurizes the internal space 114 of the package through the threads 105 and one-way or material flap seal 106, allows for tightening of the lid 104 to the cup 102, and then releases the pressurized package by reversing the vacuum 126 underneath the package to a positive pressure which ejects the filled package.

In one embodiment, a foot switch (not shown) starts a vacuum pump VP, which when the vacuum is sufficient (determined using pressure gauge #3 PG3) to hold the cup down activates pressure switch #1 PS1 to open valve #5 V5, which begins filling the package with gas from a gas cylinder GC. When the desired internal package pressure is reached (e.g. 50 psi) and detected by gauge #2 PG2, pressure switch #2 PS2 activates five valves, valve #1 V1, valve #2 V2, valve #3 V3, valve #4 V4, and valve #6 V6, which cycle and reset the system as described in the flow chart detailed in FIGS. 3A-3B.

When the pressure through the seal is discontinued, the remaining internal pressure inside the package energizes the seal 106 and maintains the internal pressure while the step of tightening the lid occurs.

The package is filled with a desired gas mixture to a preset pressure through the threaded lid during sealing, resulting—after equilibration of the gas into the product—in a desired level of effervescence in the product. If a scale is described from 1 to 5, where 1 is barely detectable effervescence, and 5 is visible and auditory effervescence (bubbles bursting from the product), the system preferably is capable of consistently reproducing any level of effervescence required in the product.

To achieve the desired effervescence and, therefore, the corresponding internal equilibrium pressures, the initial pressure is preferably greater than the subsequent equilibrium pressure in order to allow for the diffusion of gas into the product over time (e.g. a number of hours). The relationship of the initial to equilibrated pressure is a function of the mass of gas added and the headspace volume existing outside of the product within the package, according to the following equation:

$$\frac{P_1 V_1}{T_1} - \frac{P_2 V_2}{T_2} = (n_1 - n_2)R \qquad (1)$$

Where,
$P_1$=the initial pressure inside cup
$P_2$=The equilibrium pressure inside the cup
$n_1$=Initial number of moles of CO2 in the headspace of the cup
$n_2$=Number of moles of CO2 left in the head space after the absorption of CO2 into the fruit reaches equilibrium at a given pressure and temperature
$n_1-n_2$=the number of moles of CO2 that has been absorbed by the product; this depends on the amount of moisture inside the product and is relatively constant for a given product at a given temperature and pressure
R=Universal gas constant=8.3145 J/mol K
$V_1$ is the volume of cup after initial pressurization
$V_2$ is the volume after pressure reaches equilibrium. If the volume change of the cup under the pressure is negligible, i.e, V1=V2=V
$T_1$ is the initial temperature inside the cup
$T_2$ is the temperature inside the cup after pressure equilibrium is reached
If the cup is stored under refrigerated conditions, assume $T_1=T_2=T$, then equation 1 becomes:

$$\frac{(P_1 - P_2)V}{T} = (n_1 - n_2)R \qquad (2)$$

However, for a given volume of product inside a cup, if you increase the headspace or the volume of the cup, $V_1$, it will increase the initial number of moles of CO2, i.e., $n_1$ or the mass of CO2 inside the cup. In this way one can increase the fizziness level at the same pressure.

Figure 4A:
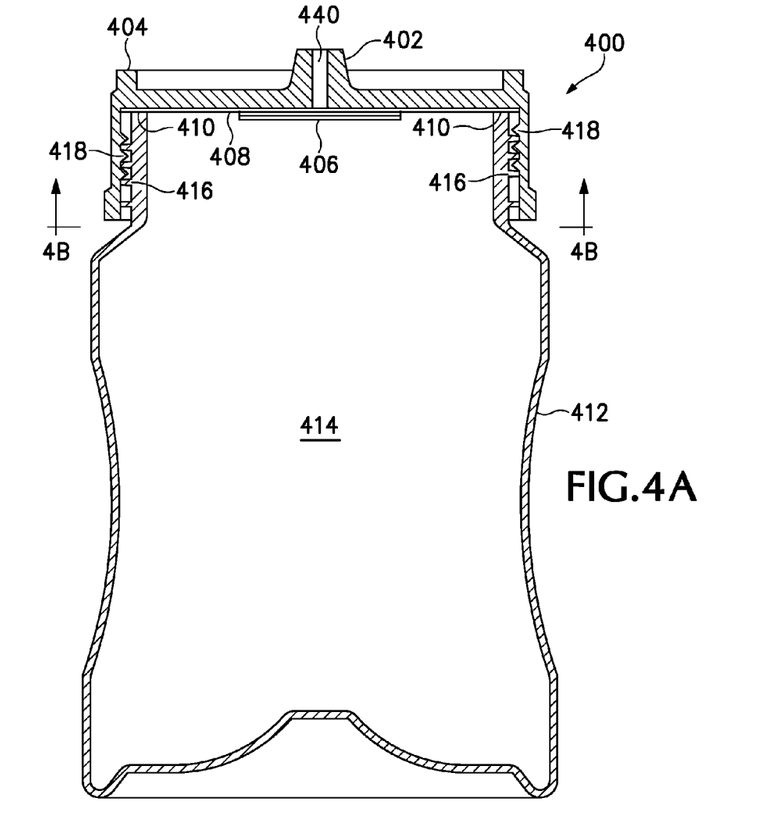
FIG. 4A is a cut side view of an exemplary high pressure food package that involves an overpressure feature.

Turning now to FIG. 4A, a cut side view of an exemplary high pressure food package that involves an overpressure feature is provided. In one embodiment, CO2 to pressurize the package 400 and generate the desired effervescence is forced through a nipple 402 in the center of the plastic cap 404 through a one-way membrane valve 406 covering a central hole in a foil induction seal liner 408 that has been electrothermally welded to the edge or rim 410 of the plastic bottle 412. A production method for such package may comprise of first filling an interior space 414 of the bottle 412 with a quantity of food product, then torquing the cap 404 including the foil liner 408 and one-way valve 406 onto the cup or bottle 412 at a predetermined force, putting the cap 404 and bottle 412 through a device to electrothermally weld the foil liner 408 to the cup edge 410 thus creating the seal, and finally filling the package 400 with CO2 gas through the nipple 402 on the cap 404. The cap 404 is preferably torqued to the bottle at a predetermined force that is low enough for easy hand removal of the cap (i.e. for use by children). The foil liner 408 provides an overpressure safety feature. If the internal pressure within the package exceeds a predetermined threshold, for example due to excessive heating of the pressurized package, the foil liner 408 is preferably designed to burst, typically near the rim 410, or separate slightly from the rim 410 thereby releasing pressure from within the package. Other materials, such as a membrane liner or a plastic film, may be used for the overpressure safety feature, and such materials may be applied using a process other than an electrothermal (i.e. induction or radio frequency (RF) heating) process to seal the material to the rim 410.

In various embodiments, the bottle 412 may comprise a cup 102 as in FIG. 1A or share one or more of the characteristics of the cup 102 previously described. Likewise, the cup 102 in FIG. 1A may comprise one or more of the characteristics of the bottle (or cup) 412 as in FIG. 4A. Similarly, the lid 104 in FIG. 1A and the cap (or lid) 404 in FIG. 4A may share one or more characteristics. For example, in one embodiment, the bottle 412 comprises threads 416 which cooperatively mate with threads 418 formed on the cap 404. However, as shown in FIG. 4A, the cooperatively mating threads 416, 418 are shaped differently than the threads 105 shown in FIG. 1A. Other thread shapes may be used.

Figure 4B:
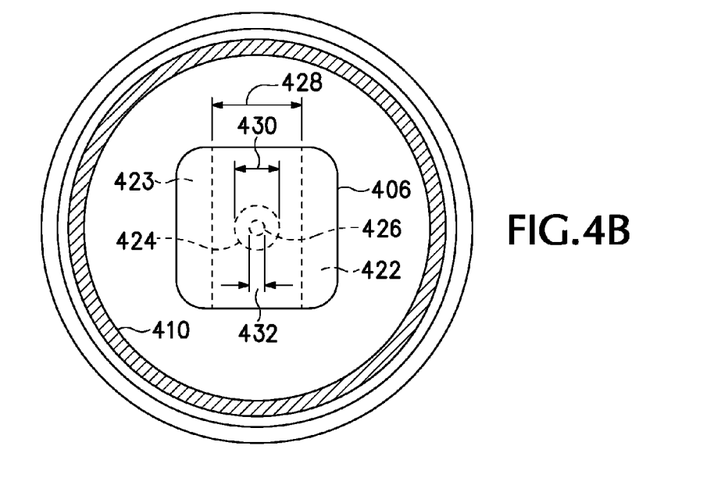
FIG. 4B is a cut bottom view of the lid portion of the high pressure food package of FIG. 4A.

FIG. 4B is a cut bottom view of the lid portion of the high pressure food package of FIG. 4A. As viewed from the bottom of the lid (or cap) 404, according to a preferred embodiment, a one-way membrane valve 406 is centered about the nipple 402 so that an opening 440 in the nipple is aligned with an opening 426 in the foil liner 408 and an opening 424 in the membrane valve 406. Gas injected into the nipple opening 440 passes through the foil liner opening 426, into the membrane valve opening 424, and the channel 420 between channel sides 422, 423 before beginning to fill the interior space 414 of the package 400. Preferably, the foil liner opening 426 has a dimension (or diameter) 432 that is at least as large as the dimension 442 of the nipple opening 440. Preferably, the valve opening 424 has a dimension 430 at least as large as the dimension 432 of the foil liner opening 426. In one embodiment, the membrane valve 406 comprises a channel 420 between channel sides 422, 423 having a width dimension 428 that is larger than the valve opening dimension 430 so that membrane material in the bottom layer 438 is able to flex upward (as internal pressure within the interior space 414 of the package builds) to seal the channel 420 and the valve opening 424.

Figure 5A:
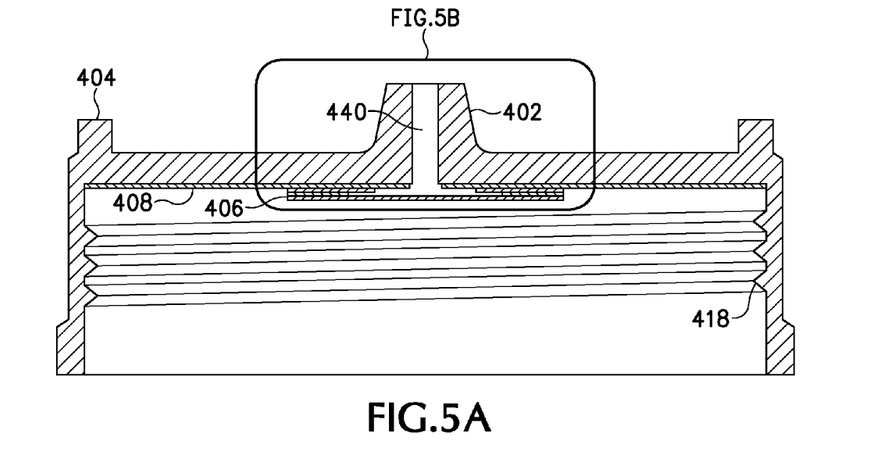
FIG. 5A is a cut side view of the lid of the high pressure food package of FIG. 4A.
Figure 5B:
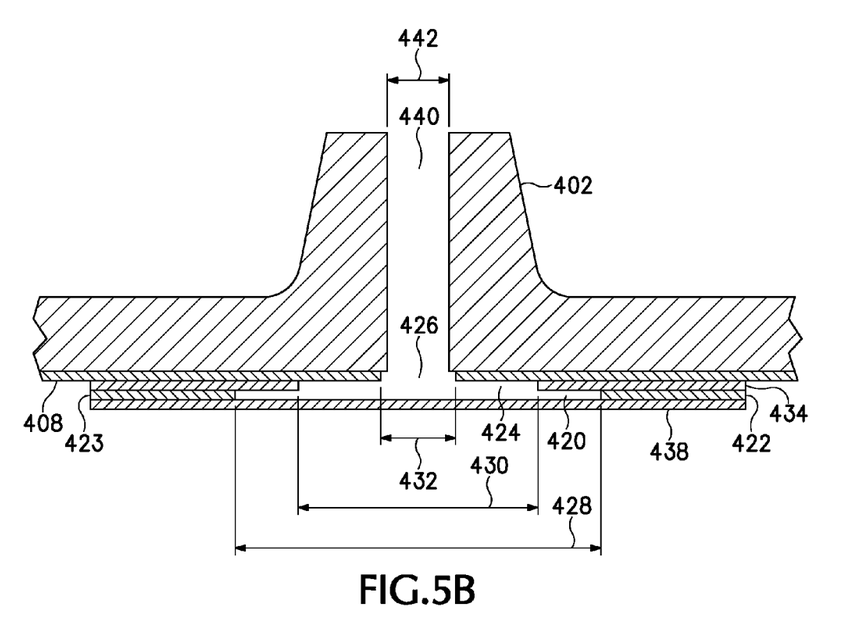
FIG. 5B is a detail sectional view of the one-way valve region of the lid of FIG. 5A.

FIG. 5A is a cut side view of the lid of the high pressure food package of FIG. 4A showing in greater detail the foil liner 408 with one-way membrane valve 406 loaded into the lid (cap) 404, according to one embodiment. FIG. 5B is a detail sectional view of the one-way valve region of the lid of FIG. 5A and shows more clearly the layers comprising the valve and liner, in one embodiment. The component layers, from top to bottom, of the plastic cap 404 with a central nipple 402, an induction seal foil liner 408, and a one-way valve 406, which itself consists of three membrane layers 434, 422/423, 438. A channel in the middle layer 422/423 of the one-way valve 406 is forced open slightly by positive pressure applied from the nipple opening 440 and directed toward the center of the valve 406 to allow gas to flow in one direction, in this case, into the bottle 412. Back pressure on the bottom layer 438 of the one-way valve 406 collapses at least the bottom layer 438 to prevent back flow of gas out of the bottle 412 and nipple 402. In one embodiment, a small amount of viscous fluid, such as, for example, a drop of food-grade oil, may be placed in the valve opening 424 (which may then migrate into the channel 420) to help seal the channel 420 as back pressure deflects the bottom layer 438 to close the one-way valve.

The induction seal foil liner 408 may comprise a foil liner material coated on one side with a plastic material that heats when passed through the induction (or RF) energy field associated with induction sealing processes. The heated plastic coating then adheres to the surface in contact with the coating. Preferably, the plastic coating is oriented so as to adhere to the rim 410 of the bottle 412, and the foil liner 408 or the weld joint between the rim 410 and foil liner 408 is suitably designed so as to fail at a predetermined pressure. For example, the foil liner 408 may be designed to fail at 90 psi internal pressure. Preferably, the foil liner 408 is suitably designed so as to burst (or develop a leak at the weld joint with the rim 410) as the lid 404 of the package 400 is twisted off/open. In a preferred embodiment, as the lid 404 is opened, the seal fails and begins to release pressure. Once the lid 404 is removed, the foil liner 408 remains on the edge/rim 410 of the bottle 412 and may be peeled off by pulling back a tab of liner material that extends just beyond the edge/rim 410 of the bottle 412.

The present inventors discovered that if the foil liner seal weld is too strong, the seal may not fail soon enough when the cap is removed, resulting in a "pop" as the seal bursts abruptly. In a preferred embodiment, the strength of the weld between the foil liner 408 and the edge of the cup 410 is controlled such that the seal it creates is the weak link in the pressure integrity of the package. That is, the foil liner 408 detaches from the edge 410 of the cup 412 when the internal pressure reaches a predetermined value, e.g. 90 psi. At this point the package can no longer hold excess internal pressure and becomes incapable of preserving the effervescent effect. This safety feature addresses situations when a package may be thermally abused by a consumer resulting in internal fermentation of the food. Instead of excess pressure potentially bursting the package in uncontrolled or undesirable ways, the liner seal material is suitably designed to fail first and thereby allow pressure to escape through the threads between the cup 412 and lid 404.

In one embodiment, after initial removal of the lid 404 from the pressurized package 400, the foil seal will have been broken but may be kept in place (e.g. by only partially peeling back the foil liner 408) so that re-closing the lid 404 over the bottle 412 once again provides a package capable of retaining internal pressure. Additional $CO_2$ may be injected into the package 400 to further extend the effervescence desired, for example, to maintain a higher fizziness level for the food product contained in the package.

Figure 6:
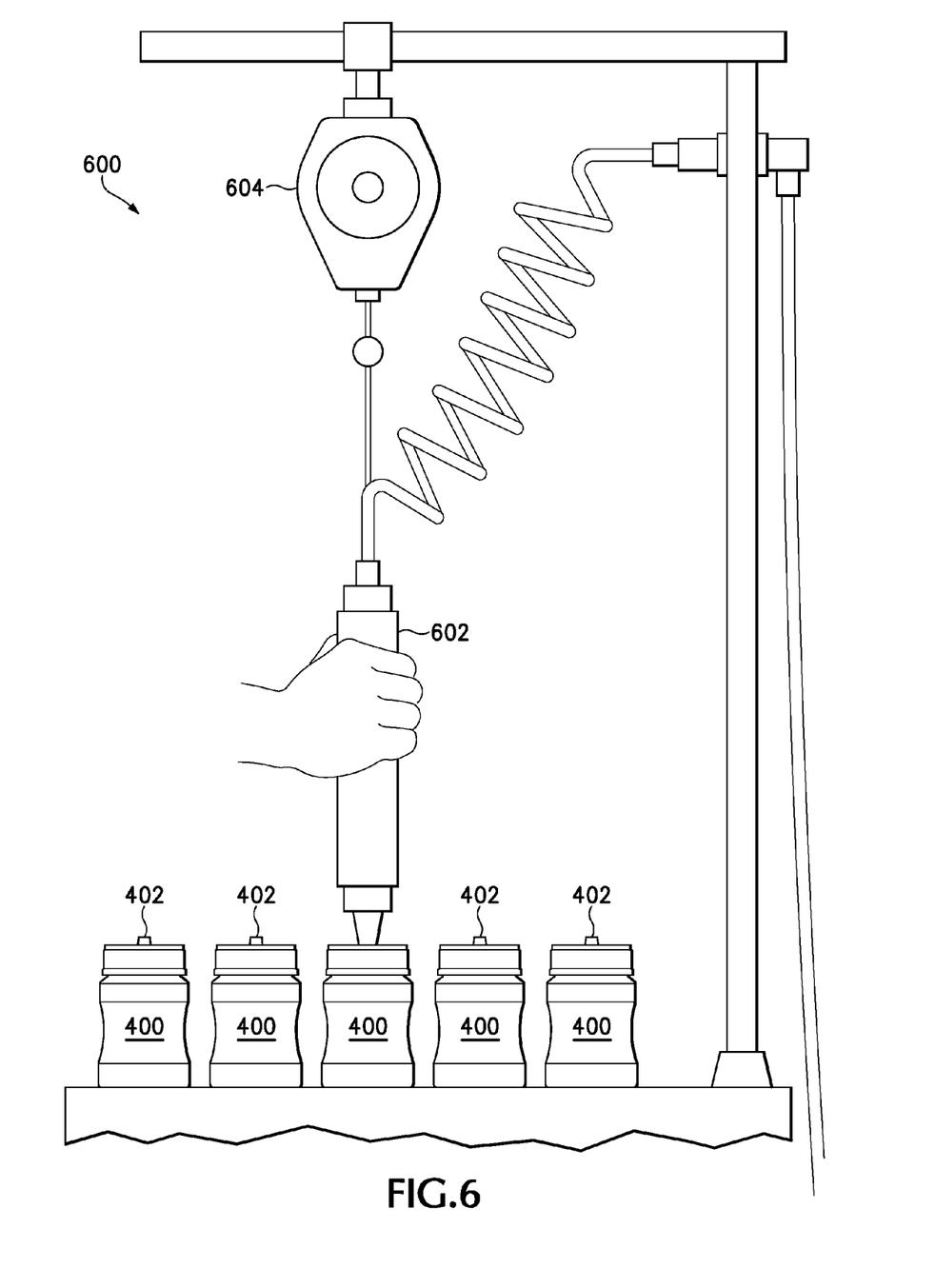
FIG. 6 is an exemplary system for use with the high pressure food package of FIG. 4A.

FIG. 6 is an exemplary system 600 for use with the high pressure food package of FIG. 4A. The pressure required to achieve a desired level of effervescence is a function of head space volume and time as described above. In one embodiment, the fill pressure is about 65 psi, which equilibrates after the food absorbs the $CO_2$ gas to a final pressure of about 40 psi. As shown, a hand device 602 may be used to inject the gas (e.g. $CO_2$ or a $CO_2$-$O_2$ mixture) into each package 400 through its nipple 402. The hand device 602 preferably is suspended by a retractable mechanism 604 and includes pressure sensors or switches for automatically stopping the flow of additional gas when the internal pressure of the package 400 reaches a predetermined level (e.g. about 65 psi).

Preferably, the cup 102 (or 412) may be sized for one, two, or three servings. In one embodiment, a single serving size is in the range of 2 oz to 3 oz. In one embodiment, a single serving package has a cup size of 2.6 oz (75 grams). One, two, or three servings may correspond with 2 oz, 4 oz, and 6 oz cup sizes, respectively. Cup sizes for one, two, or three services may correspond with cup sizes within ranges of 2-2.6 oz, 4-5.2 oz, and 6-7.8 oz, respectively. Other serving sizes, corresponding cup sizes, and ranges of cup sizes may be used. Preferably, the package is portable by hand and capable of being held in one hand.

The terms and expressions which have been employed in the forgoing specification are used therein as terms of description and not of limitation, and there is no intention in the use of such terms and expressions of excluding equivalence of the features shown and described or portions thereof, it being recognized that the scope of the invention is defined and limited only by the claims which follow.

We claim:

1. A method of packaging and carbonating fruit-containing food product for retail distribution and consumption using a high pressure food package, the method comprising:
   (a) providing a hand held sized cup having a bottom and sides extending upward from said bottom to a rim;
   (b) receiving a quantity of fruit-containing food product into an interior space of said cup through an opening defined by said rim, said opening of said cup being wide enough to allow finger access to pieces of non-liquid fruit-containing food product in said interior space;
   (c) covering said opening with a lid having threads cooperatively engaging threads on said cup;
   (d) receiving a gas comprising $CO_2$ into said interior space, so as to pressurize said interior space with said gas to an initial pressure P1, through a nipple formed on said lid extending upward in a direction away from said interior space;
   (e) retaining said initial high pressure P1 and an equilibrium pressure P2 at a time thereafter in said interior space within said cup, wherein P1 is greater than P2 and the difference between P1 and P2 comprises pressure, and thereby said gas comprising $CO_2$, absorbed at least in part by said pieces of non-liquid fruit-containing food product in said interior space, and wherein substantially none of said difference between P1 and P2 comprises pressure escaping from said interior space;
   (f) irreversibly sealing a substantially planar liner to said rim formed about said opening of said cup, said liner having a one-way membrane valve attached thereto and configured to allow said step of receiving said gas into said interior space through said nipple formed on said lid, said one-way membrane valve consisting of layers of substantially planar material oriented in substantially co-planar relation to said liner, thereby said liner with one-way membrane valve comprising parallel co-planar layers;
   (g) said liner with one-way membrane valve retaining pressure within said interior space up to an over pressure P3, where P3 is greater than P1 and the difference between P3 and P1 comprises increased pressure in said interior space due to fermentation of said fruit-containing food product or changes in conditions subsequent to said step of receiving said gas to said initial pressure P1; and
   (h) said liner with one-way membrane valve automatically allowing pressure to escape from said interior space once pressure in said interior space exceeds said over pressure P3 by allowing pressure to escape through a rupture in material comprising said liner or in the seal between said liner and said rim.

* * * * *